United States Patent [19]

Galbraith

[11] Patent Number: 4,709,882

[45] Date of Patent: Dec. 1, 1987

[54] ELECTRIC PROPULSION SYSTEM FOR AIRCRAFT

[75] Inventor: Andrew D. Galbraith, Los Altos, Calif.

[73] Assignee: Lockheed Missiles & Space Company, Inc., Sunnyvale, Calif.

[21] Appl. No.: 555,203

[22] Filed: Nov. 25, 1983

[51] Int. Cl.$^4$ .............................................. B64D 27/24
[52] U.S. Cl. .................................. 244/53 R; 244/62; 244/57; 429/14; 429/17; 429/26
[58] Field of Search ................. 244/53 R, 57, 62, 59, 244/17.11, 134 B; 429/14, 17, 26, 34; 446/36, 57

[56] References Cited

U.S. PATENT DOCUMENTS

| | | | |
|---|---|---|---|
| 1,605,428 | 11/1926 | Dornier | 244/57 |
| 2,455,313 | 11/1948 | Osofsky | 244/134 B |
| 3,198,664 | 8/1965 | Kunz | 429/26 |
| 3,843,410 | 10/1974 | Spahrbier | 429/26 |
| 3,937,424 | 2/1976 | Meier et al. | 244/53 R |
| 3,957,230 | 5/1976 | Boucher et al. | 446/57 |
| 4,349,613 | 9/1982 | Winsel | 429/17 |

OTHER PUBLICATIONS

Pub. entitled "Electric Propulsion for High Performance Light Aircraft," presented by A. D. Galbraith at AIAA/SAE/ASME 15th Joint Propulsion Conference—Jun. 18–20, 1979 at Las Vegas, Nevada.
Report entitled "Practical Feasibility Assessment of Electric Power Propulsion in Small Helicopters Using Lithium Hydroxide Battery Technology," prepared by P. T. Kirchen, D. R. Jacoby and A. D. Galbraith under Contract No. A84939—B for NASA—AMES Research Center, dated Dec. 1, 1981.

Primary Examiner—Trygve M. Blix
Assistant Examiner—Rodney Corl
Attorney, Agent, or Firm—Wood, Dalton, Phillips Mason & Rowe

[57] ABSTRACT

An aircraft having a rotatively driven blade cooperating with an electrochemical power system for operating an electric drive system. The blade provides cooling heat transfer relative to the lithium/peroxide fuel system effecting desirable separation of the lithium-hydroxide monohydrate in a suitable filter/plenum provided as a portion of the power system. In one form, the cooling is effected by disposing a heat transfer portion of the power system in the path of air flow generated by the propulsion blade of the aircraft. In another form, the cooling is effected by flowing the electrolyte through the propulsion blade. Molarity of the electrolyte is maintained by separating the precipitated lithium-hydroxide monohydrate in solid form in the filter/plenum and addition of replacement hydrogen/peroxide solution from the reservoir thereof.

14 Claims, 4 Drawing Figures

ELECTRIC PROPULSION SYSTEM FOR AIRCRAFT

TECHNICAL FIELD

This invention relates to aircraft and in particular to propulsion systems for aircraft.

BACKGROUND ART

In one conventional form of aircraft comprising a helicopter, the propulsion of the aircraft is effected by means of a main rotor and an anti-torque rotor. Alternatively, the helicopter may utilize two main rotors without an anti-torque rotor.

The main rotor causes downward flow of air in the normal operation of the helicopter so as to direct at least a portion of the air adjacent the tail boom of the craft.

It is conventional in such aircraft to utilize internal combustion engines as the power source for the drive system. Such power systems have the serious disadvantages of being dependent upon depletable fossil fuel supplies. Further, such systems are affected by altitude and air temperature conditions so as to be limited in the full power ratings thereof.

Further, such internal combustion drive systems have the serious disadvantages of utilizing combustion air, requiring efficient ingestion thereof with attendant maintenance and failure problems.

Another serious disadvantage of the conventional internal combustion engines is the substantial engine noise generated in use.

Still another serious disadvantage is the formation of undesirable emissions aggravating the pollution problems.

Still another disadvantage of the present systems is the change in weight of fuel during operation so that the aircraft's center of gravity changes.

Still another disadvantage of the present systems is the relatively heavy weight of the engines, such as required by the mechanical transmissions utilized therewith.

Another disadvantage is in the relatively low efficiency of energy conversion. Still another disadvantage is the relatively high operating cost due to relatively short engine lifetime, high maintenance requirements, and relatively high initial cost.

Another disadvantage resides in the limitation on the torque capabilities of the internal combustion engines.

DISCLOSURE OF INVENTION

The present invention comprehends an improved propulsion system for the aircraft, and more specifically, comprehends an improved electric propulsion system for use with aircraft, such as helicopters.

The present invention comprehends the provision of an aircraft having a blade, such as a rotor, and an improved power supply for driving the blade, including an electric motor and an electrochemical power system means, including a lithium perioxide fuel cell.

The power system means includes a heat transfer portion and means mounting the heat transfer portion in heat exchange relationship to air flowed as an incident of operation of the aircraft blade.

In one form, the heat transfer means is disposed on the tail boom of the aircraft. In a modified form, the heat transfer means is disposed within the blade of the aircraft.

The invention comprehends the provision of an electrochemical power system for use in driving the propulsion blade of an aircraft, which is independent of ambient pressure conditions and ambient temperature conditions.

The invention comprehends the provision of a plurality of the power producing modules, each of which is capable of providing the rated cruise power to the propulsion blade.

The invention comprehends the provision of such an electrochemical power system comprising a closed power system free of ingestion of atmospheric air thereinto during operation thereof.

The invention comprehends the provision of such a closed electrical power system which is free of chemical emissions therefrom during operation thereof.

The invention comprehends the provision of such an aircraft propulsion means wherein the power system is substantially soundless in operation.

In one form, the power system includes a lithium/carbon dioxide fuel cell.

The invention comprehends the provision of means for obtaining carbon dioxide for operation of the fuel cell from the ambient atmosphere.

In the illustrated embodiment, the means for obtaining the carbon dioxide from the ambient atmosphere includes a wet wall reactor scrubber.

The invention comprehends the provision of such a power system including a plenum defining means for collecting precipitated lithium-hydroxide monohydrate, where the system comprises a lithium/peroxide system. The plenum further defines gravity gas separation means as well as a filter means.

The improved power supply means for driving the propulsion blade of an aircraft of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
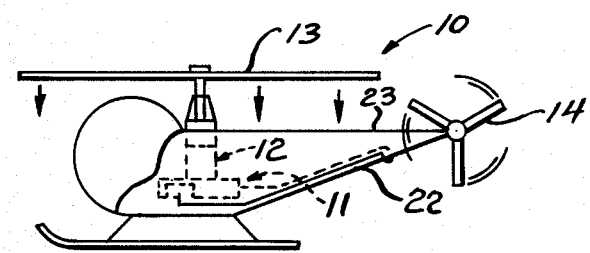
FIG. 1 is a side elevation of an aircraft having a power supply embodying the invention.
Figure 2:
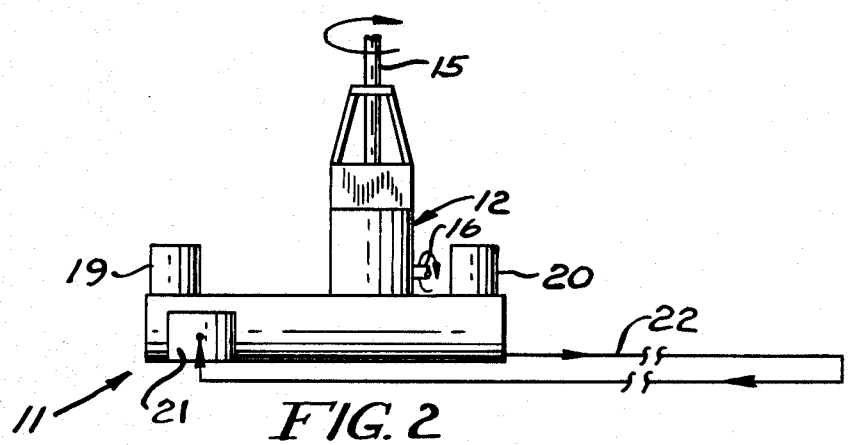
FIG. 2 is a fragmentary schematic elevation of the power system.
Figure 3:
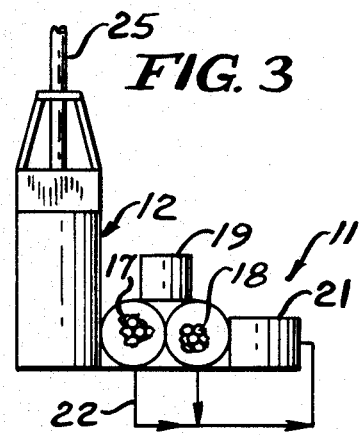
FIG. 3 is a fragmentary schematic end elevation thereof.

In the illustrative embodiment of the invention as disclosed in the drawing, an aircraft generally designated 10 is provided with an improved power supply generally designated 11 for energizing an electrical drive system generally designated 12. In the illustrated embodiment, aircraft 10 comprises a helicopter and the drive system 12 powers both the main rotor blade 13 and the anti-torque rotor blade 14.

Electrical drive system 12 comprises a conventional drive unit including an electric motor, gearing and transmission means. As is conventional, the drive system 12 drives the main rotor 13 through a vertical drive shaft 15 and drives the anti-torque rotor through a rearwardly extending drive means 16. As will be obvious to those skilled in the art, the helicopter may be alternatively arranged to utilize two main rotors in lieu of the combination single main rotor/anti-torque rotor construction of the illustrated embodiment.

The invention comprehends the provision of power supply 11 including two or more lithium aqueous electrolyte hydrogen peroxide bipolar power modules for providing the electrical power to the drive system 12. In the illustrated embodiment, two power modules 17 and 18 are illustrated, each containing 50 bipolar lithium electrodes having a 12" diameter and a length of approximately 63 cm so as to provide a power output of approximately 600 amperes at 100 direct current volts. Thus, in the illustrated embodiment, power supply 11 is arranged to provide approximately 120 kilowatts of power to the drive system, with each of the power supply modules 17 and 18 having sufficient capacity to provide cruise power in the event the other module fails in flight. Illustratively, the above discussed power supply is advantageously adapted for use with the Hughes Helicopter, Inc. Model 269 helicopter in conjunction with a General Electric Co./U.S. Navy Advanced Light Weight Torpedo (ALWT) electric motor.

The electric drive system 12 further includes an electrolyte reservoir 19 and a hydrogen peroxide reservoir 20. In the illustrated embodiment, reservoir 19 has a capacity of approximately 30 liters. The hydrogen peroxide in reservoir 20 is at a concentration of 50% having a weight of approximately 260 lbs.

The invention comprehends the cooling of the electrolyte so as to effect a precipitation of the lithiumhydroxide monohydrate in solid form in a filter/plenum prior to the return of the electrolyte to the power modules. Gas separation is also effected in the filter/plenum 21 by utilizing the filter/plenum as a gravity separator. Replacement hydrogen peroxide is metered into the electrolyte from the reservoir 20 so as to effectively maintain the desired molarity of the electrolyte in use.

The invention comprehends the precipitation of the lithium-hydroxide monohydrate by effectively cooling the electrolyte prior to its delivery to the filter/plenum chamber. In the illustrated embodiment, the electrolyte is cooled by heat transfer with the ambient atmosphere through an external cooling tube 22 extended along the tail boom 23 of the helicopter so as to be in heat transfer relationship with air forced downwardly by the main rotor blade 13, as shown in FIG. 1. In the illustrated embodiment, tail boom 23 may further serve as a heat sink and radiator for further cooling of the electrolyte conducted through the cooling tube 22. In the illustrated embodiment, the cooling tube comprises a ½" diameter metal tube. As shown, the tube runs along one side of the tail boom and returns along the opposite side so as to obtain maximum efficiency in the cooling operation.

The heat transfer efficiency is sufficient to provide necessary cooling of the electrolyte to effect the precipitation separation even at hover conditions of the aircraft.

While the invention has been disclosed in connection with a helicopter aircraft, as will be obvious to those skilled in the art, it is equally applicable to all forms of aircraft requiring a lightweight drive system. The invention provides a further desirable advantage in the independence of fossil fuel energy source means. Further, the invention provides full system power independent of altitude and air temperature conditions. By eliminating the need for air ingestion into the engine, substantial reduction in maintenance and system failure problems is obtained.

Further, the use of the electrical drive system effectively eliminates engine noise. Further, the drive system effectively eliminates emissions from the system into the atmosphere.

Figure 4:
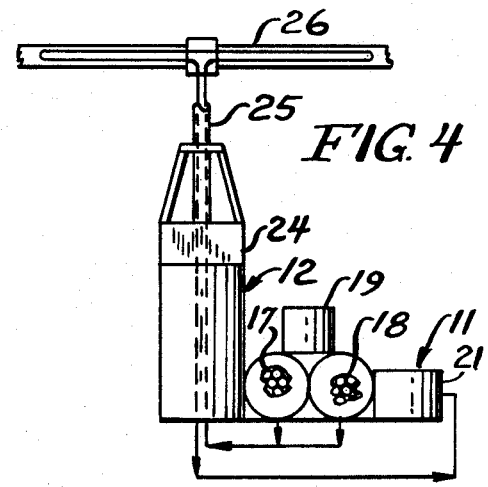
FIG. 4 is a fragmentary end elevation of a modified form of aircraft structure embodying the invention.

As illustrated in FIG. 4, the invention comprehends the alternative utilization of the main rotor as the cooling means. Thus, as shown in FIG. 4, the cooling tubing 24 may be provided through the rotor shaft 25 and extended through the main rotor 26, as an alternative cooling system.

Another highly desirable advantage resulting from the use of the novel power system means of the present invention is the maintained center of gravity disposition as a result of the maintained weight of fuel during the flight.

The invention further permits weight reduction due to elimination of expensive mechanical transmissions of the prior art. The increased efficiency in the energy conversion of the electrochemical power source provides further economy and efficiency in flight. Illustratively, the energy conversion efficiency of such a lithium-peroxide system is approximately 66% compared to the conventional 20% efficiency of fossil fuel engines.

Further, the use of the improved drive system of the present invention effectively minimizes operating costs by increasing useful life of the drive system, with reduced maintenance and lower first cost.

INDUSTRIAL APPLICABILITY

The drive system of the present invention is advantageously adapted for use with different forms of aircraft as a result of the simple power transmission and small lightweight motor components thereof.

The drive system of the present invention provides for potentially extremely high torque availability where desired.

The foregoing disclosure of specific embodiments is illustrative of the broad inventive concepts comprehended by the invention.

What is claimed is:

1. In an aircraft having a blade to be rotatively driven in effecting powered flight of the aircraft, an improved power supply system for driving said blade comprising:
   electric motor means for rotatively driving said blade;
   electrochemical power system means for generating electrical power to operate said motor means, said electrochemical power system means including a lithium/peroxide fuel cell utilizing an aqueous electrolyte at a desired molarity; and
   means for maintaining said desired molarity of said electrolyte, said molarity maintaining means including means for circulating said electrolyte from said electrochemical power system means through separate heat transfer means for cooling thereof so as to effect precipitation of lithium-hydroxide monohydrate, said molarity maintaining means also including means for collecting said precipitated lithium-hydroxide monohydrate.

2. The aircraft structure of claim 1 wherein said collecting means includes a plenum in which said precipitated lithium-hydroxide monohydrate is collected, said heat transfer means including a cooling tube extending from said lithium-peroxide fuel cell to a remote point of said aircraft and returning to said plenum.

3. The aircraft structure of claim 1 wherein said collecting means includes gravity gas separation means, said heat transfer means including a cooling tube extending from said lithium/peroxide fuel cell to a remote point of said aircraft and returning to said gravity gas separation means.

4. The aircraft structure of claim 1 wherein said collecting means includes a plenum in which said precipitated lithium-hydroxide monohydrate is collected, said plenum further defining gravity gas separation means, said heat transfer means including a cooling tube extending from said lithium/peroxide fuel cell to a remote point of said aircraft and returning to said plenum.

5. The aircraft structure of claim 1 wherein said collecting means includes a plenum in which said precipitated lithium-hydroxide monohydrate is collected, said plenum further defining filter means, said heat transfer means including a cooling tube extending from said lithium/peroxide fuel cell to a remote point of said aircraft and returning to said plenum.

6. In an aircraft having a blade to be rotatively driven in effecting powered flight of the aircraft, an improved power supply for driving said blade comprising:
   electric motor means for rotatively driving said blade;
   electrochemical power system means for generating electrical power to operate said motor means, said electrochemical power system means utilizing an aqueous electrolyte at a desired molarity; and
   means for maintaining said electrolyte at said desired molarity, said molarity maintaining means including means for circulating said electrolyte through heat transfer means mounted in heat exchange relationship to air flowed as an incident of operation of said blade for cooling thereof so as to effect precipitation of lithium-hydroxide monohydrate, said molarity maintaining means also including means for collecting said precipitated lithium-hydroxide monohydrate.

7. The aircraft structure of claim 6 wherein said heat transfer means includes a cooling tube extending from said electrochemical power system means, through said blade, to said collecting means, and returning to said electrochemical power system means.

8. The aircraft structure of claim 6 wherein said heat transfer means includes a cooling tube extending from said electrochemical power system means to a remote point of said aircraft, to said collecting means, and returning to said electrochemical power system means, at least a portion of said cooling tube being mounted exteriorly on a body portion of said aircraft.

9. In an aircraft having a blade to be rotatively driven in effecting powered flight of the aircraft, an improved power supply for driving said blade comprising:
   electric motor means for rotatively driving said blade;
   electrochemical power system means for generating electrical power to operate said motor means, said electrochemical power system means comprising means for providing rated electrical power independent of ambient air pressure conditions, said electrochemical power system means utilizing an aqueous electrolyte at a desired molarity; and
   means for maintaining said electrolyte at said desired molarity, said molarity maintaining means including means for circulating said electrolyte through heat transfer means for cooling thereof so as to effect precipitation of lithium-hydroxide monohydrate, said molarity maintaining means also including means for collecting said precipitated lithium-hydroxide monohydrate, said heat transfer means extending from said electrochemical power system means to a remote point of said aircraft and to said collecting means before returning to said electrochemical power system means.

10. In an aircraft having a blade to be rotatively driven in effecting powered flight of the aircraft, an improved power supply for driving said blade comprising:
    electric motor means for rotatively driving said blade;
    electrochemical power system means for generating electrical power to operate said motor means, said electrochemical power system means comprising means for providing rated electrical power independent of ambient temperature conditions, said electrochemical power system means utilizing an aqueous electrolyte at a desired molarity; and
    means for maintaining said electrolyte at said desired molarity, said molarity maintaining means including means for circulating said electrolyte through heat transfer means for cooling thereof so as to effect precipitation of lithium-hydroxide monohydrate, said molarity maintaining means also including means for collecting said precipitated lithium-hydroxide monohydrate, said heat transfer means extending from said electrochemical power system means to a remote point of said aircraft and to said collecting means before returning to said electrochemical power system means.

11. In an aircraft having a blade to be rotatively driven in effecting powered flight of the aircraft, an improved power supply for driving said blade comprising:
    electric motor means for rotatively driving said blade;
    electrochemical power system means for generating electrical power to operate said motor means, said electrochemical power system means including a plurality of power producing modules, each of which comprises means for providing a cruise power to said blade, said electrochemical power system means utilizing an aqueous electrolyte at a desired molarity; and
    means for maintaining said electrolyte at said desired molarity, said molarity maintaining means including means for circulating said electrolyte through heat transfer means for cooling thereof so as to effect precipitation of lithium-hydroxide monohydrate, said molarity maintaining means also including means for collecting said precipitated lithium-hydroxide monohydrate, said heat transfer means extending from said electrochemical power system means to a remote point of said aircraft and to said collecting means before returning to said electrochemical power system means.

12. In an aircraft having a blade to be rotatively driven in effecting powered flight of the aircraft, an improved power supply for driving said blade comprising:
    electric motor means for rotatively driving said blade;
    closed electrochemical power system means for generating electrical power to operate said motor means, said closed electrochemical power system means comprising means free of ingestion of atmospheric air thereinto during operation thereof, said closed electrochemcial power system means utilizing an aqueous electrolyte at a desired molarity; and means for maintaining said electrolyte at said desired molarity, said molarity maintaining means including means for circulating said electrolyte through heat transfer means for cooling thereof so as to effect precipitation of lithiumhydroxide monohydrate, said molarity maintaining means also including means for collecting said precipitated lithium-hydroxide monohydrate, said heat transfer means extending from said closed electrochemical power system means to a remote point of said aircraft and to said collecting means before returning to said closed electrochemical power system means.

13. In an aircraft having a blade to be rotatively driven in effecting powered flight of the aircraft, an improved power supply for driving said blade comprising:

electric motor means for rotatively driving said blade;

closed electrochemical power system means for generating electrical power to operate said motor means, said closed electrochemical power system means comprising means free of chemical emissions therefrom during operation thereof, said closed electrochemical power system means utilizing an aqueous electrolyte at a desired molarity; and means for maintaining said electrolyte at said desired molarity, said molarity maintaining means including means for circulating said electrolyte through heat transfer means for cooling thereof so as to effect precipitation of lithium-hydroxide monohydrate, said molarity maintaining means also including means for collecting said precipitated lithium-hydroxide monohydrate, said heat transfer extending from said closed electrochemical system means to a remote point of said aircraft and to said collecting means before returning to said closed electrochemical power system means.

14. In an aircraft having a blade to be rotatively driven in effecting powered flight of the aircraft, an improved power supply for driving said blade comprising:

electric motor means for rotatively driving said blade;

electrochemical power system means for generating electrical power to operate said motor means, said electrochemical power system means comprising means for generating said electrical power substantially soundlessly, said electrochemical power system means utilizing an aqueous electrolyte at a desired molarity; and means for maintaining said electrolyte at said desired molarity, said molarity maintaining means including means for circulating said electrolyte through heat transfer means for cooling thereof so as to effect precipitation of lithium-hydroxide monohydrate, said molarity maintaining means also including means for collecting said precipitated lithium-hydroxide monohydrate, said heat transfer means extending from said electrochemical power system means to a remote point of said aircraft and to said collecting means before returning to said electrochemical power system means.

* * * * *